US008033848B2

(12) United States Patent
Khemakhem et al.

(10) Patent No.: US 8,033,848 B2
(45) Date of Patent: *Oct. 11, 2011

(54) HIGH DENSITY COAXIAL SWITCHING JACK

(75) Inventors: M'hamed Anis Khemakhem, Minnetonka, MN (US); Jeffrey Louis Peters, Eagan, MN (US); Duane Sand, Brooklyn Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/580,906

(22) Filed: Oct. 16, 2009

(65) Prior Publication Data

US 2010/0136813 A1    Jun. 3, 2010

Related U.S. Application Data

(63) Continuation of application No. 12/221,448, filed on Aug. 1, 2008, now Pat. No. 7,604,514, which is a continuation of application No. 11/651,936, filed on Jan. 10, 2007, now Pat. No. 7,410,378, which is a continuation of application No. 11/109,839, filed on Apr. 18, 2005, now Pat. No. 7,175,455.

(60) Provisional application No. 60/671,849, filed on Apr. 15, 2005.

(51) Int. Cl.
    *H01R 29/00* (2006.01)
(52) U.S. Cl. ........................... 439/188; 439/944
(58) Field of Classification Search .............. 439/944, 439/668, 188
    See application file for complete search history.

(56) References Cited

U.S. PATENT DOCUMENTS

| 3,873,785 | A | 3/1975 | Lieberman |
| 3,946,390 | A | 3/1976 | Alexander et al. |
| 4,749,968 | A | 6/1988 | Burroughs |
| 4,815,104 | A | 3/1989 | Williams et al. |
| 4,820,200 | A | 4/1989 | Lau |
| 5,233,501 | A | 8/1993 | Allen et al. |
| 5,246,378 | A | 9/1993 | Seiceanu |
| 5,348,491 | A | 9/1994 | Louwagie et al. |
| 5,467,062 | A | 11/1995 | Burroughs |
| 5,702,262 | A | 12/1997 | Brown et al. |
| 5,885,096 | A | 3/1999 | Ogren |
| 5,913,701 | A | 6/1999 | Olson et al. |
| 5,964,607 | A | 10/1999 | Finke et al. |
| 6,045,378 | A | 4/2000 | Follingstad |
| 6,504,726 | B1 | 1/2003 | Grabinger et al. |
| 6,511,330 | B1 | 1/2003 | Norris |

(Continued)

FOREIGN PATENT DOCUMENTS

EP        0 561 238 A    9/1993

(Continued)

*Primary Examiner* — Briggitte R Hammond
(74) *Attorney, Agent, or Firm* — Merchant & Gould P.C.

(57) ABSTRACT

A coaxial switching jack with a pair of coaxial assemblies mounted within a housing having a pair of front openings. The coaxial assemblies each include a center conductor and a shell conductor. The center conductors are connected by a first spring and the shell conductors are connected by a second spring. Insertion of a coaxial cable connector within one of the front openings deflects the springs from the corresponding coaxial assembly and disconnects the center and shell conductors of the two assemblies. The jack may also be configured to provide an electrical connection between the center and shell conductors of the second coaxial assembly if a coaxial cable connector is inserted within the first coaxial assembly. The connection between the center and shell conductors of the second coaxial assembly may allow for selection of a desired electrical impedance.

14 Claims, 21 Drawing Sheets

U.S. PATENT DOCUMENTS

| | | |
|---|---|---|
| 6,575,792 B2 | 6/2003 | Henneberger et al. |
| 6,589,062 B1 | 7/2003 | Ogren et al. |
| 6,608,764 B2 | 8/2003 | Clark et al. |
| 6,743,032 B2 | 6/2004 | Ogren et al. |
| 6,817,876 B2 | 11/2004 | Cooper et al. |
| 6,848,948 B1 | 2/2005 | Khemakhem et al. |
| 6,881,099 B2 | 4/2005 | Henneberger et al. |
| 6,953,368 B2 | 10/2005 | Khemakhem et al. |
| 7,175,455 B2 | 2/2007 | Khemakhem et al. |
| 7,244,131 B1 | 7/2007 | Khemakhem et al. |
| 7,410,378 B2 | 8/2008 | Khemakhem et al. |

FOREIGN PATENT DOCUMENTS

| | | |
|---|---|---|
| EP | 0 706 723 B1 | 5/1998 |
| WO | WO 96/37929 A | 11/1996 |

HIGH DENSITY COAXIAL SWITCHING JACK

CROSS REFERENCE TO RELATED APPLICATIONS

This application is a continuation of application Ser. No. 12/221,448, filed Aug. 1, 2008, which is a continuation of application Ser. No. 11/651,936, filed Jan. 10, 2007, now U.S. Pat. No. 7,410,378, which is a continuation of application Ser. No. 11/109,839, filed Apr. 18, 2005, now U.S. Pat. No. 7,175,455, which claims the benefit of provisional application Ser. No. 60/671,849, filed Apr. 15, 2005, which applications are incorporated herein by reference in their entirety.

RELATED PATENT

This application relates to U.S. Pat. No. 5,467,062, the disclosure of which is incorporated herein by reference.

FIELD

The present invention relates generally to devices for making connections between telecommunication equipment. More specifically, the present invention relates to coaxial switching jack assemblies for connecting coaxial cables.

BACKGROUND

In a typical switching arrangement, a connection panel might be mounted in a studio, with a number of signal generating devices and a number signal processing devices. Coaxial cables might be used to transmit signal from signal generating devices to signal processing devices or between different signal processing devices. Flexibility in configuration of the connections between this equipment is desirable so that different signal generating or processing needs may be accommodated quickly and easily. Many of the devices may have signal in and signal out paths, so that each such device has a pair of coaxial cables extending from it to the connection panel. These pairs of cables are connected to a pair of openings of a switching jack. Multiple devices may be connected to the rear of the switching jacks. When connection is desired between different pieces of equipment connected to the panel, coaxial patch cables inserted in the front of the switching jacks are used. As configurations of equipment change, the connections between equipment may be adapted by rearranging the patch cables without disturbing the connection between the equipment and the panel.

Coaxial switching jacks permit signals carried by coaxial cables between different pieces of broadcast and telecommunications equipment to be configured and directed as needed. Similar switching jacks may be used for digital and analog audio signals, as well as for video signals. It is desirable to have switching jacks which may be used for any of theses signals, as well as switching jacks that can selectively loop pairs of signals, connect a third cable to one of the pairs of signals while terminating the other signal, and connect to both signals of the pair to other cables.

SUMMARY

The present invention relates to a coaxial switching jack with a pair of coaxial assemblies mounted within a housing having a pair of front openings. The coaxial assemblies each include a center conductor and a shell conductor. The center conductors are connected by a first spring and the shell conductors are connected by a second spring. Insertion of a coaxial cable connector within one of the front openings deflects the springs from the corresponding coaxial assembly and disconnects the center and shell conductors of the two assemblies. The jack may also be configured to provide an electrical connection between the center and shell conductors of the second coaxial assembly if a coaxial cable connector is inserted within the first coaxial assembly. The connection between the center and shell conductors of the second coaxial assembly may allow for selection of a desired electrical impedance.

The present invention further relates to a panel with mounting plates attached to a frame. A plurality of coaxial switching jacks are mounted to a rear of the mounting plates. Openings in the front of the switching jacks are accessible through openings in the mounting plate.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
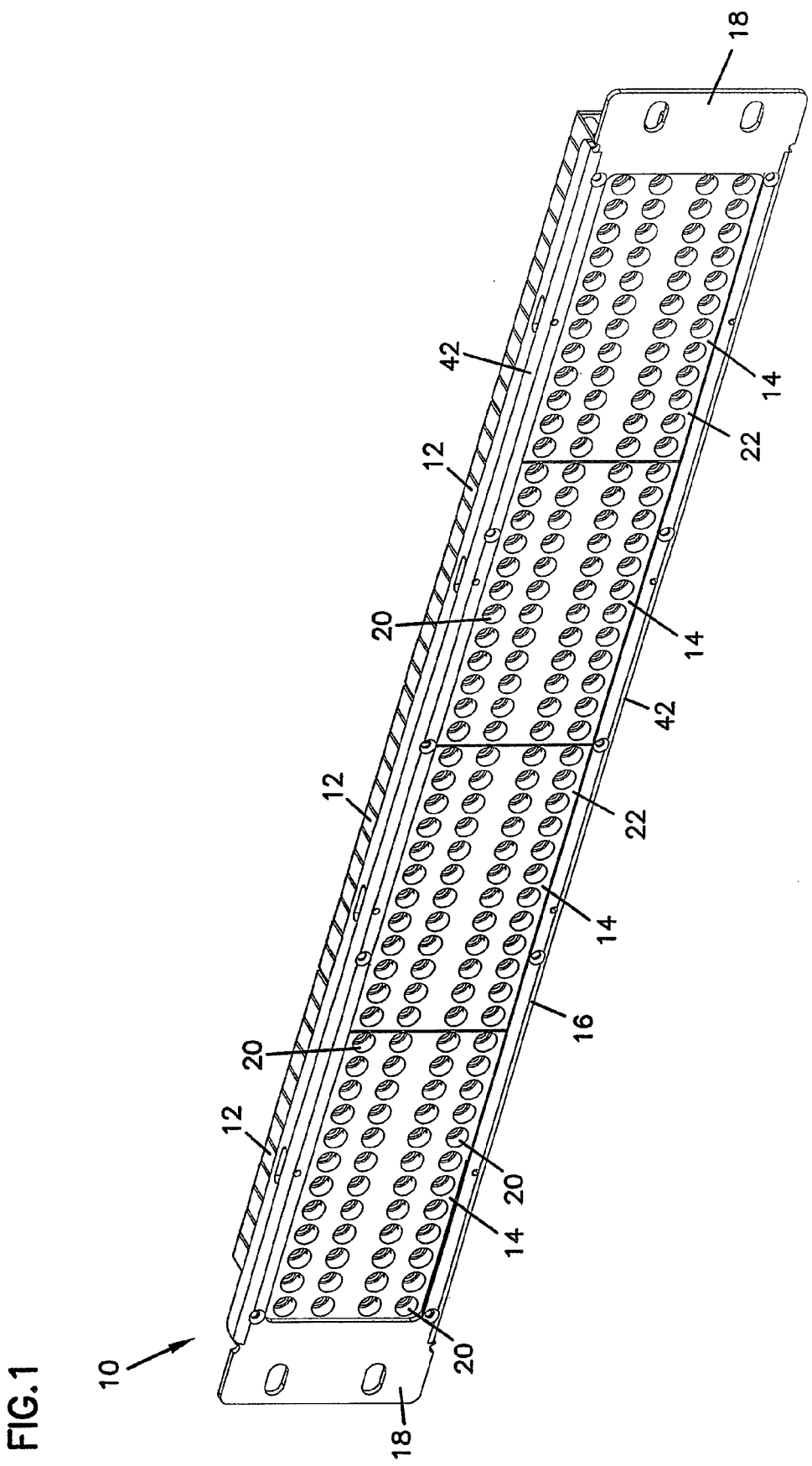
FIG. 1 is a front perspective view of a coaxial switching panel according to the present invention.
Figure 2:
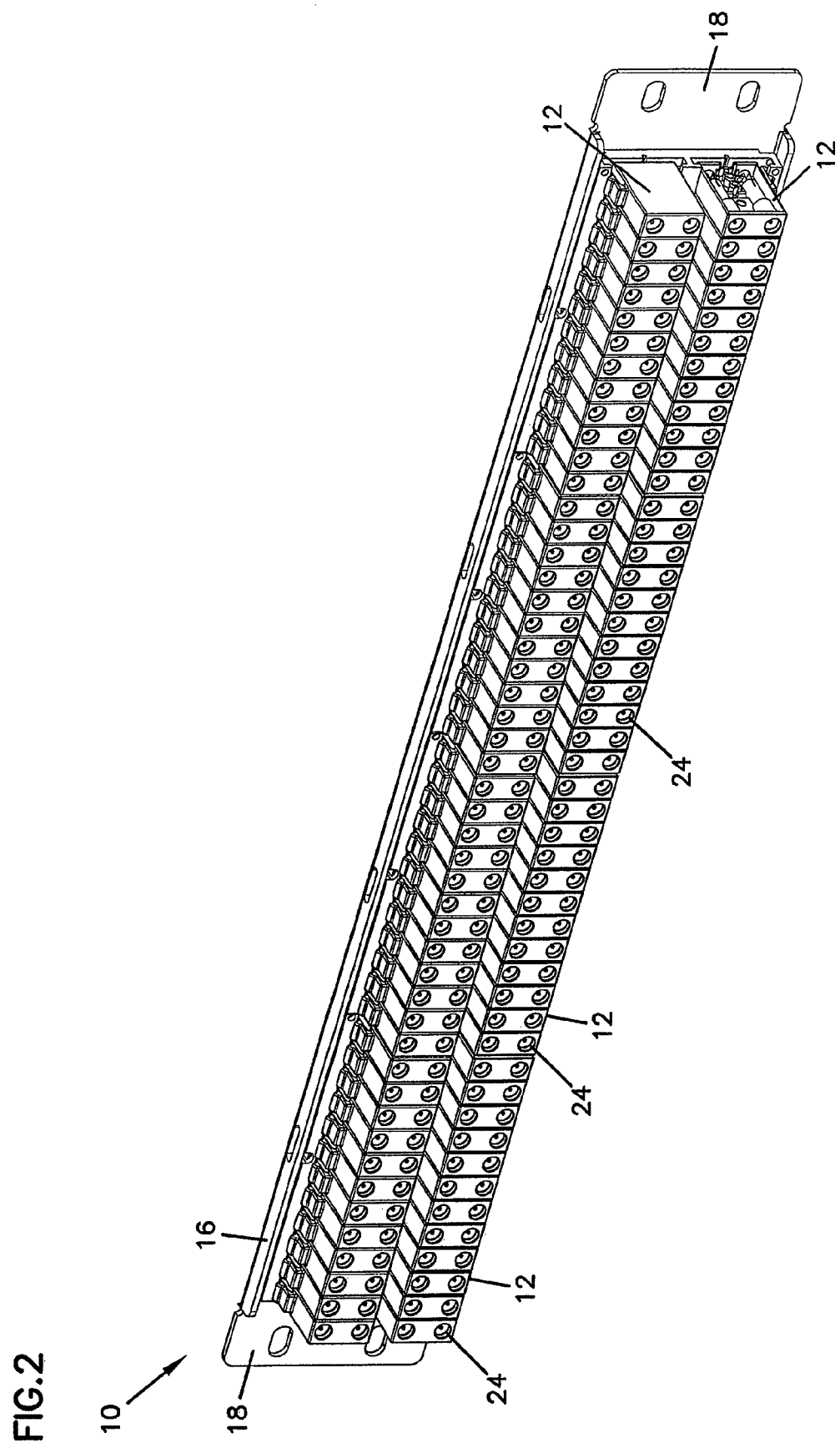
FIG. 2 is a rear perspective view of the switching panel of FIG. 1.
Figure 19:
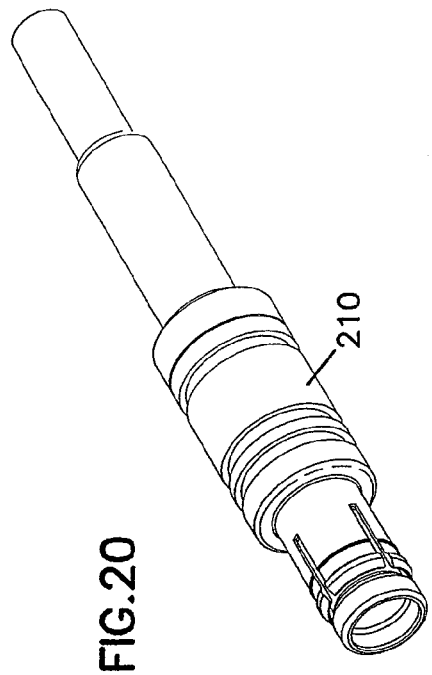
FIG. 19 is a perspective view of a first coaxial cable connector for use with the switching jack of FIG. 9.
Figure 20:
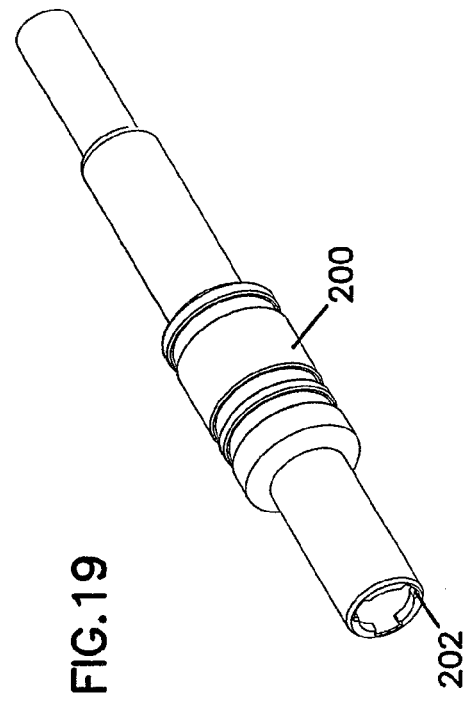
FIG. 20 is a perspective view of a second coaxial cable connector for use with the switching jack of FIG. 9.
Figure 21:
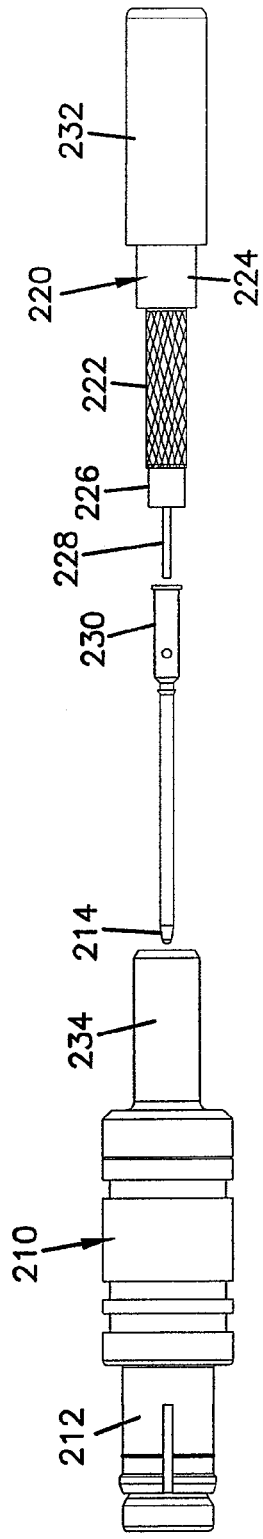
FIG. 21 is an exploded side view of the coaxial cable connector of FIG. 20 mounted to a coaxial telecommunications cable.
Figure 22:
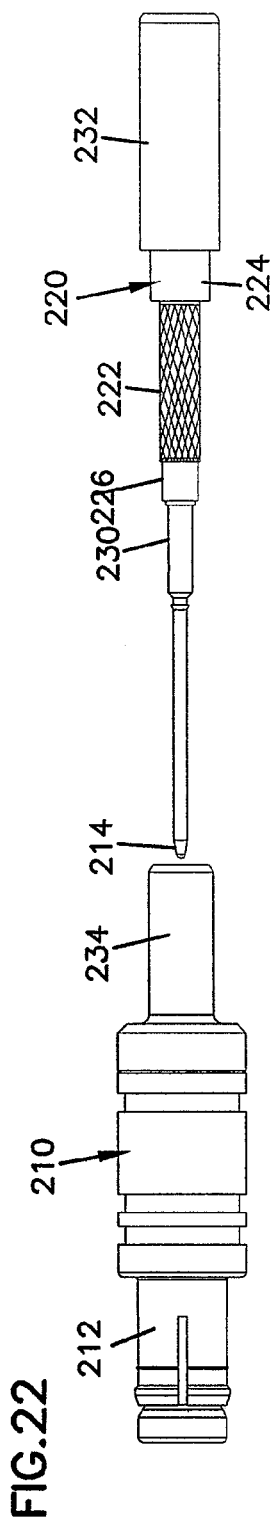
FIG. 22 is a side of the exploded coaxial cable connector of FIG. 21, with a center conductor of the cable crimped to a center conductor of the coaxial cable connector.
Figure 23:
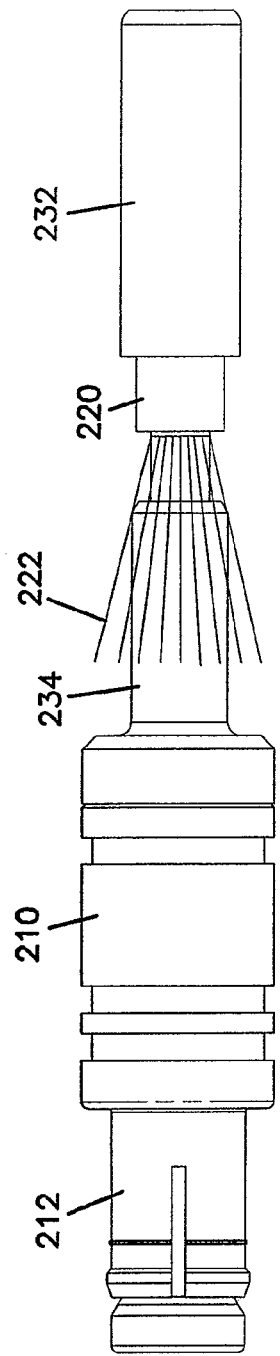
FIG. 23 is a side view of the exploded coaxial cable connector of FIG. 22, with the center conductors inserted within an outer shell of the coaxial cable connector and a shield conductor of the cable extend about a portion of an outer shell of the coaxial cable connector.
Figure 24:
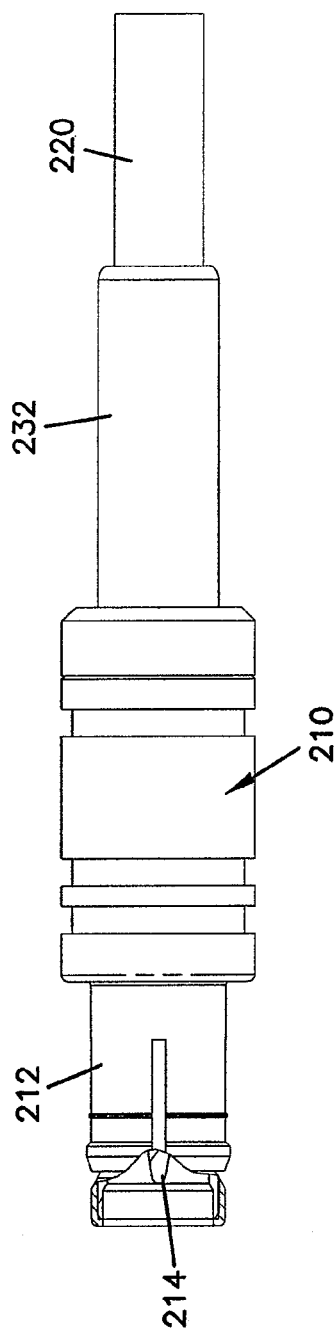
FIG. 24 is an assembled side view of the coaxial cable connector of FIG. 21, with the shield conductor crimped to the outer shell of the coaxial cable connector and a distal portion of the coaxial cable connector shown in partial cross-section.

FIGS. 1 and 2 show a telecommunications switching panel 10 with a plurality of coaxial switching jacks 12 mounted to a plurality of mounting plates 14 and a frame 16 to which mounted plates 14 are assembled. Frame 16 may include a pair of mounting flanges 18 for mounting panel 10 to another structure, such as an equipment rack. Panel 10 includes a plurality of connector openings 20 through mounting plates 14 permitting access to switching jacks 12 through a front face 22 of mounting plates 14 using a coaxial cable connector (such as shown in FIG. 19, below). Each opening 22 permits access to one of allow access to front openings of switching jacks 12. On a rear end of each switching jack 12 is a pair of rear openings 24 which are configured to accept coaxial cable connectors.

Figure 3:
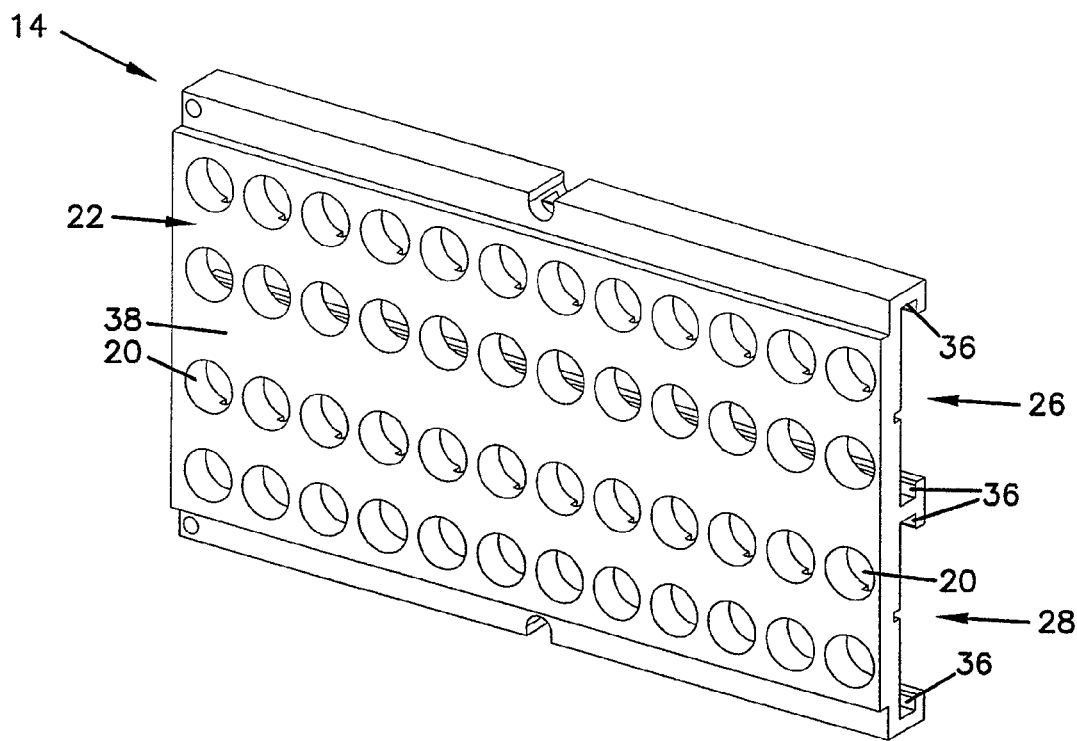
FIG. 3 is a front perspective view of a jack mounting plate of the switching panel of FIG. 1.
Figure 4:
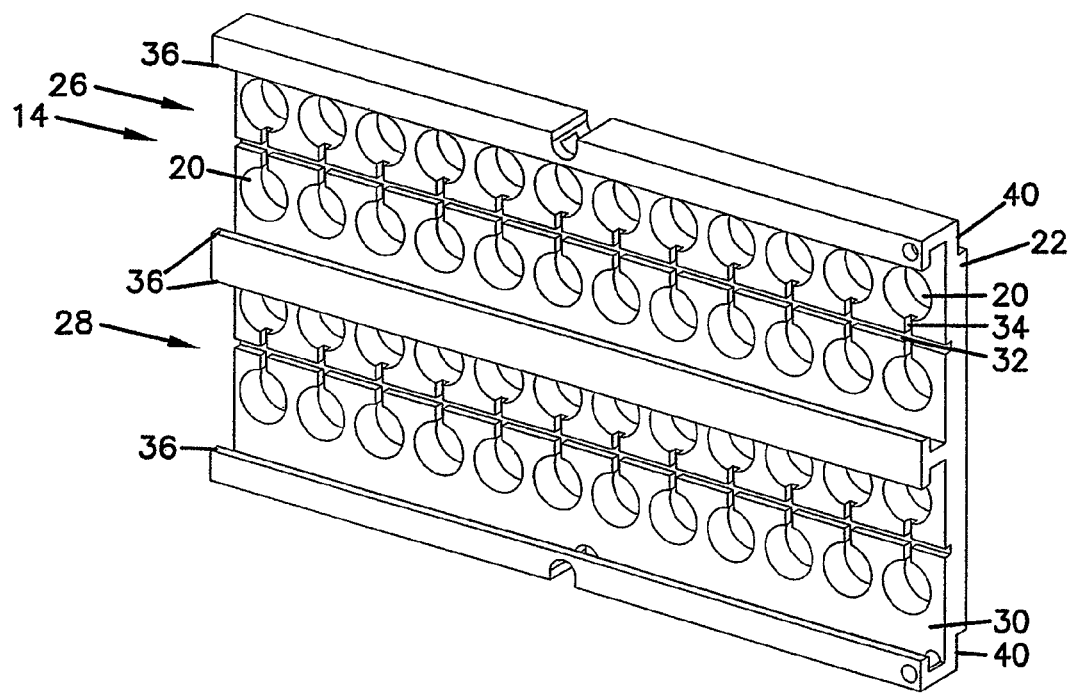
FIG. 4 is a rear perspective view of the jack mounting plate of FIG. 3.

FIGS. 3 and 4 show mounting plate 14 which accommodates two rows of switching jacks 12 in an upper row 26 and a lower row 28. A rear face 30 includes a longitudinal groove 32 and a transverse groove 34 which cooperate to orient and align switching jacks 12 behind openings 20. Each row 26 and 28 includes a pair of mounting flanges 36 extending from rear face 30 to engage a releasable latch of switching jack 12. Front face 22 may include a raised portion 38 and a recessed portion 40 to facilitate mounting to frame 16. Recessed edges 40 receive a longitudinal rail 42 of frame 16 to position mounting plate 14 and raised portion 38 is offset from the recessed portion so that front face 22 will be generally flush with frame 16.

Figure 5:
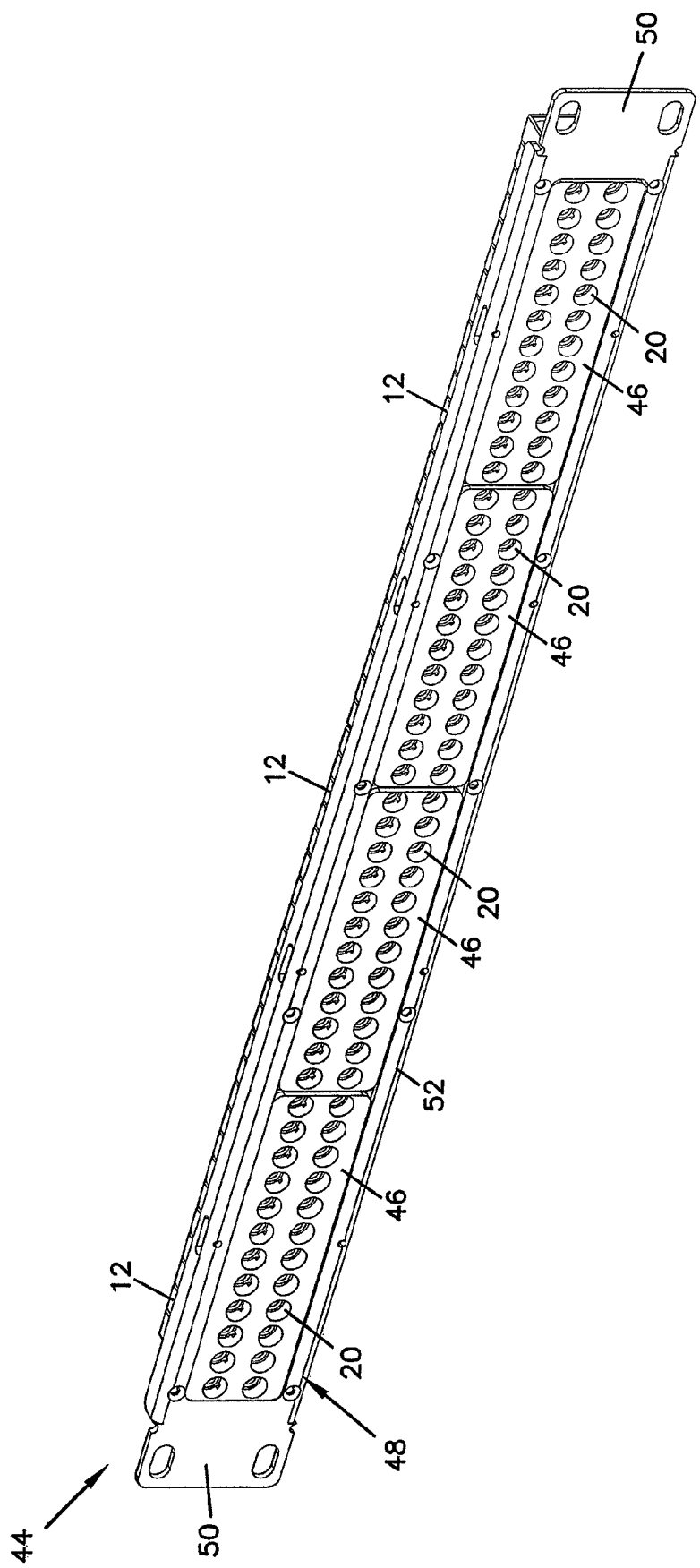
FIG. 5 is a front perspective view of an alternative coaxial switching panel according to the present invention.
Figure 6:
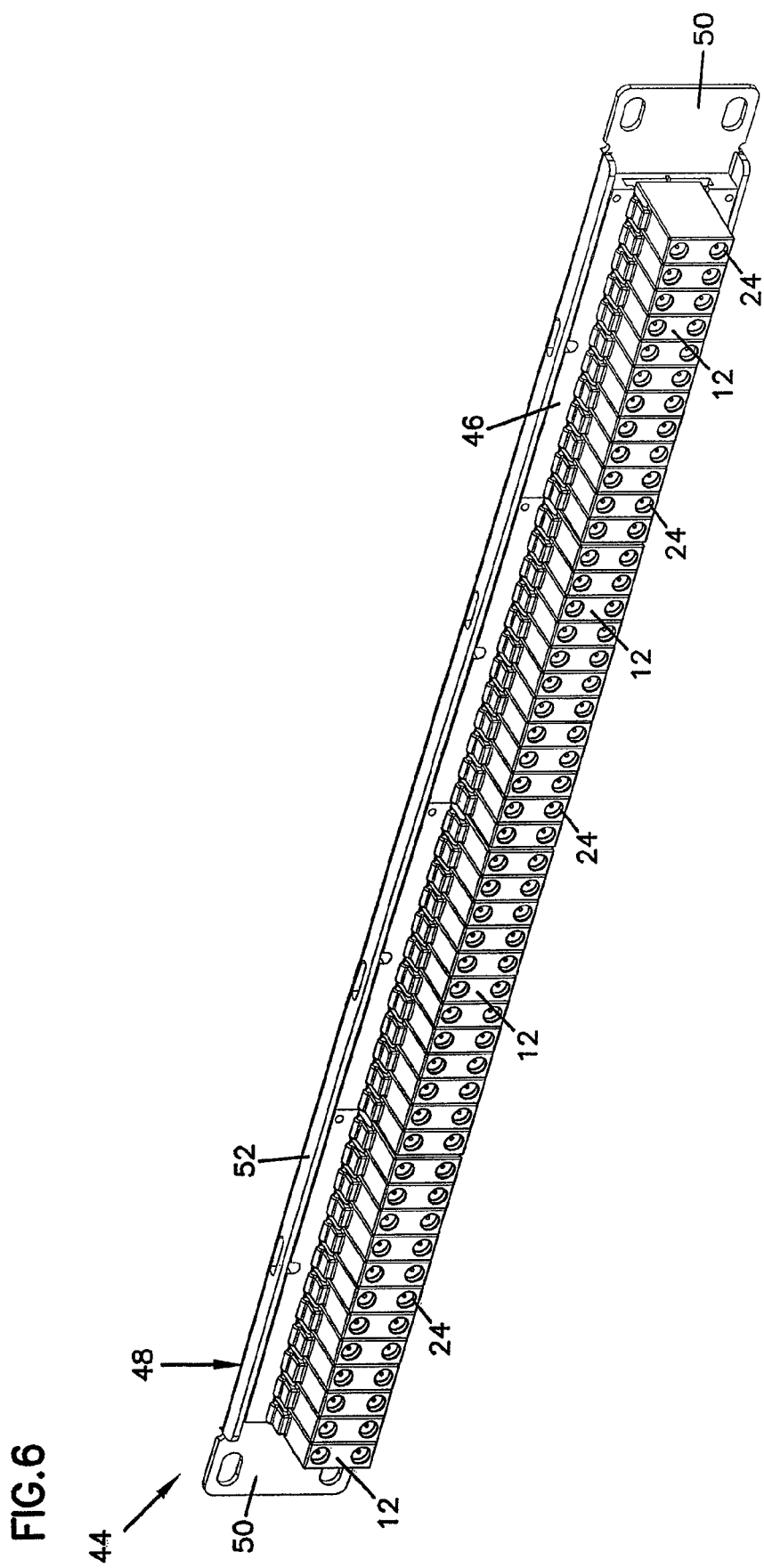
FIG. 6 is a rear perspective view of the switching panel of FIG. 5.

FIGS. 5 and 6 show a second embodiment 44 of a switching jack panel with a plurality of switching jacks 12 mounted to a plurality of mounting plates 46. Mounting plates 46 are mounted to a frame 50 having a pair of mounting flanges 50 and longitudinal rails 52. A plurality of front openings 20 in mounting plates 46 provide access to switching jacks 12 through mounting plates 46 from the front of panel 44. Each of the switching jacks 12 also includes rear openings 24. Panel 44 is similar is construction and function to panel 10, but only includes a single row 54 of switching jacks 12.

Figure 7:
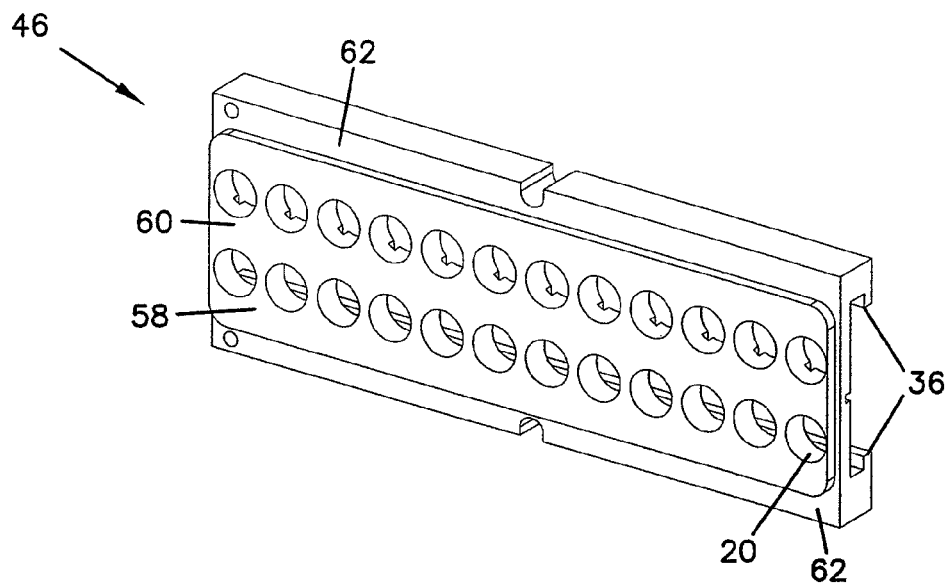
FIG. 7 is a front perspective view of a jack mounting plate of the switching panel of FIG. 6.
Figure 8:
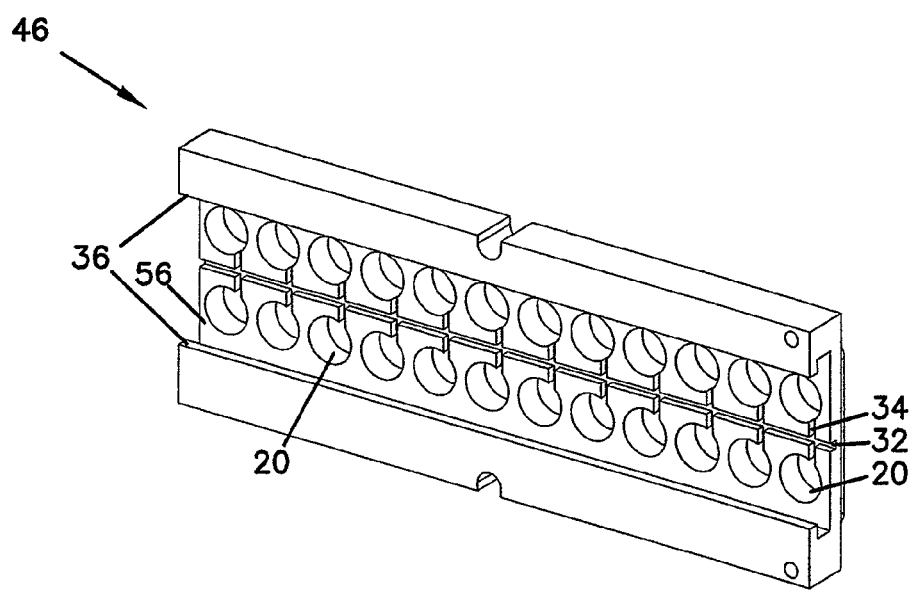
FIG. 8 is a rear perspective view of the jack mounting plate of FIG. 6.

FIGS. 7 and 8 show mounting plate 46 with a rear face 56 and a pair of flanges 36 for engaging a releasable latch of switching jack 12. Also on rear face 56 are longitudinal groove 32 and transverse grooves 34 for aligning and orienting switching jacks 12 with openings 20. A front face 58 includes a raised portion 60 and a recessed edge 62.

Figure 9:
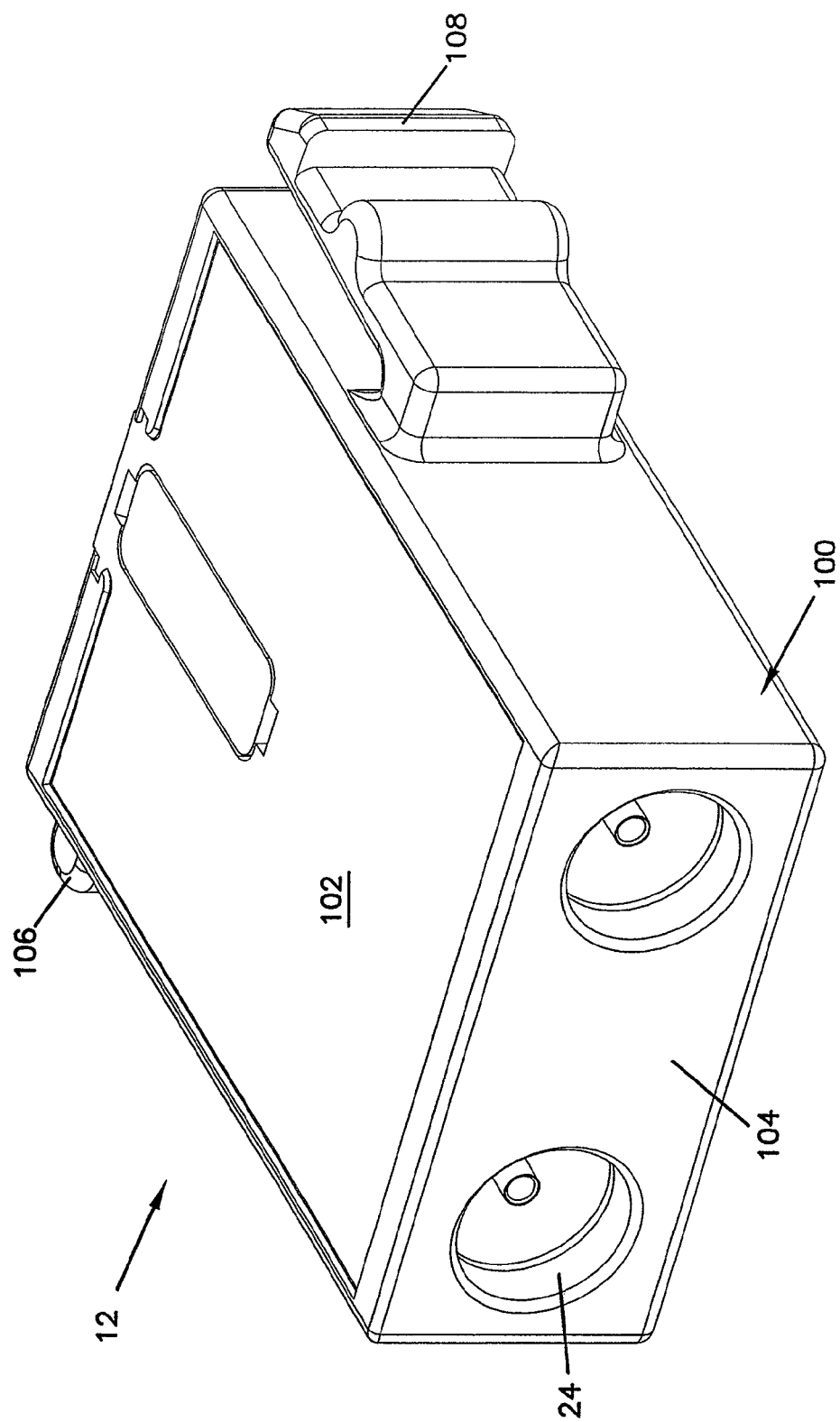
FIG. 9 is a perspective view of a coaxial switching jack according to the present invention.
Figure 10:
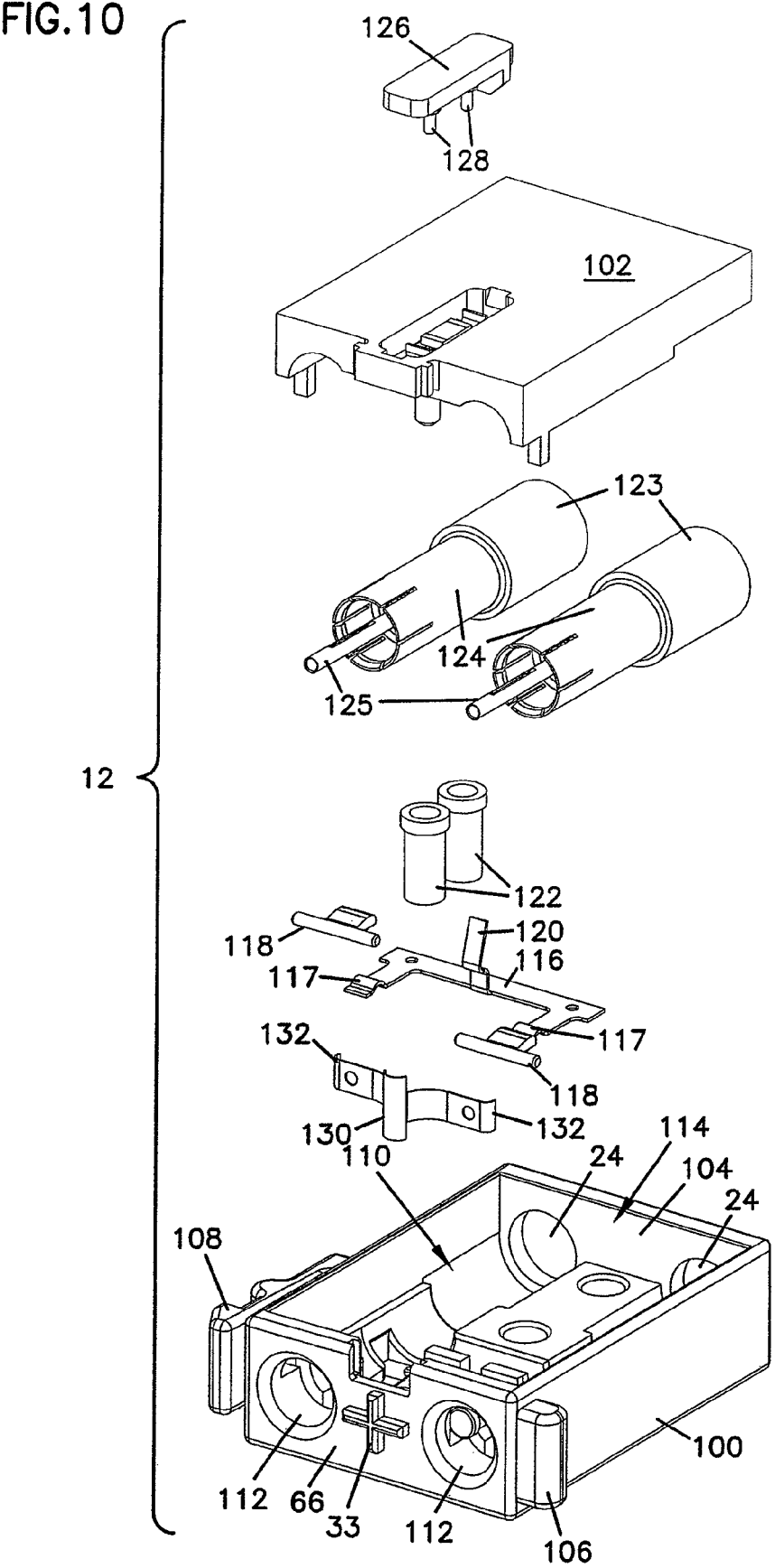
FIG. 10 is an exploded perspective view of the switching jack of FIG. 9.

Referring now to FIGS. 9 and 10, switching jack 12 includes a housing 100 with a cover 102 and a pair of rear openings 24 in a rear wall 104. A tab 106 and an opposing releasable latch 108 extend from housing 100 and cooperate to engage flanges 36 of either mounting plate 14 or 46. Housing 100 and cover 102 cooperate to define an interior 110. Access into interior 110 for cable connectors may be through rear openings 24 or through front openings 112 which are aligned with openings 20. The components mounted within interior 110 may be inserted through an top opening 114 in housing 100 which is closed off by cover 102.

Mounted within interior 110 include a shield conductor contact spring 116 with a pair of pivoting insulated actuators 118 and an extension 120. Also mounted within interior 110 is pair of resistor sockets 122, which are electrically separated from each other, and one of which is in electrical contact with extension 120 of shield conductor spring 116. Also mounted within interior 110 is a pair of coaxial connector assemblies 124, each with a shield conductor 123 and a center conductor 125. A center conductor contact spring 130 with a pair of extensions 132 is mounted so that each of the extensions 132 is normally in contact with of the center conductors of coaxial connector assembly 124. A pair of arms with contact pads 117 of shield conductor contact spring 116 are each normally in contact with the shield conductor 123 of one of the coaxial connector assemblies 124. Resistor pad 126 includes a pair of pins 128 which engage resistor sockets 122.

On a front face 66 of housing 100, between front opening 112, is a protrusion 33 configured to engage grooves 32 and 34 of rear face 56 of mounting plates 14 and 46.

Figure 11:
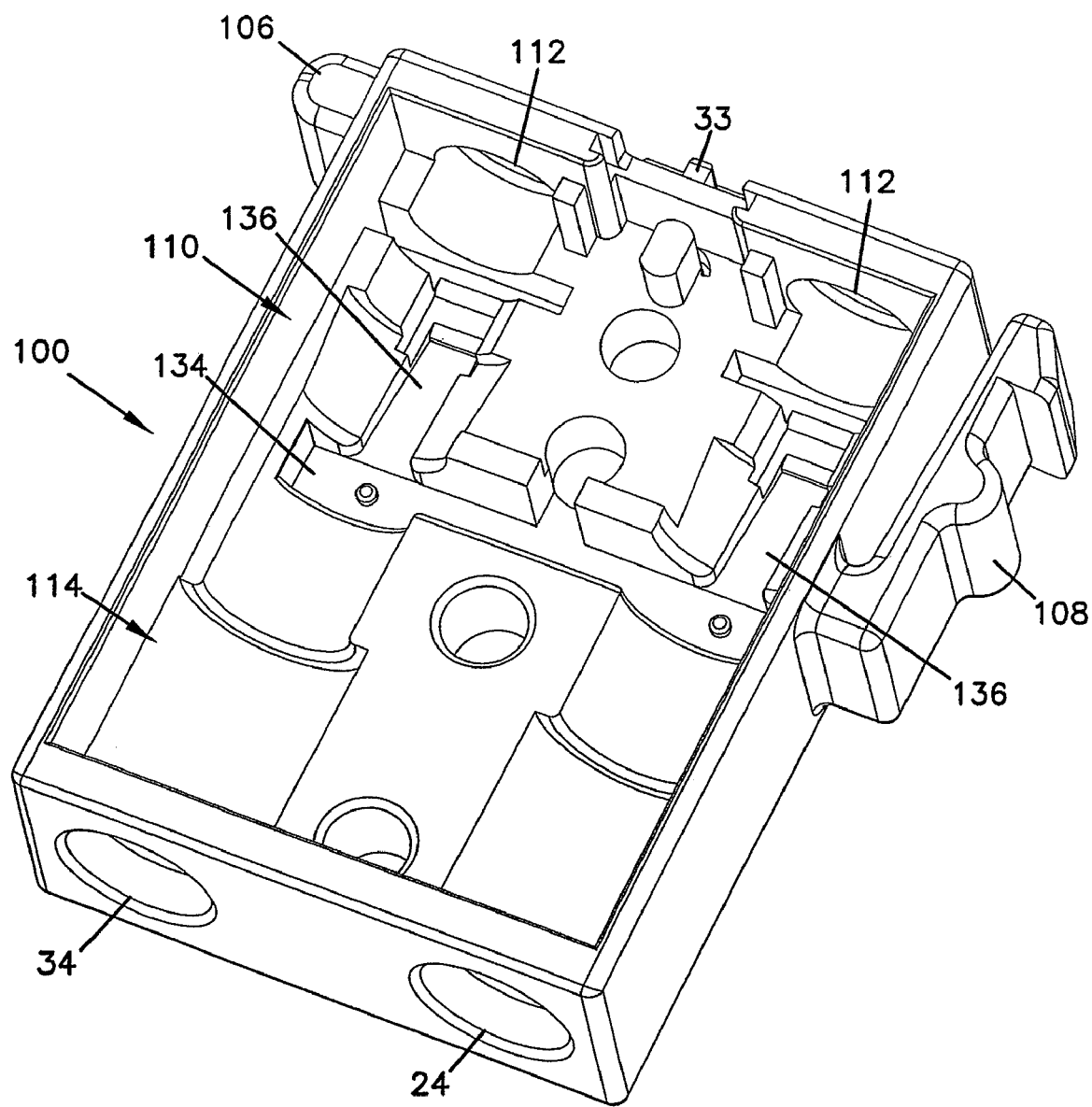
FIG. 11 is a perspective view of the housing of the switching jack of FIG. 9.
Figure 12:
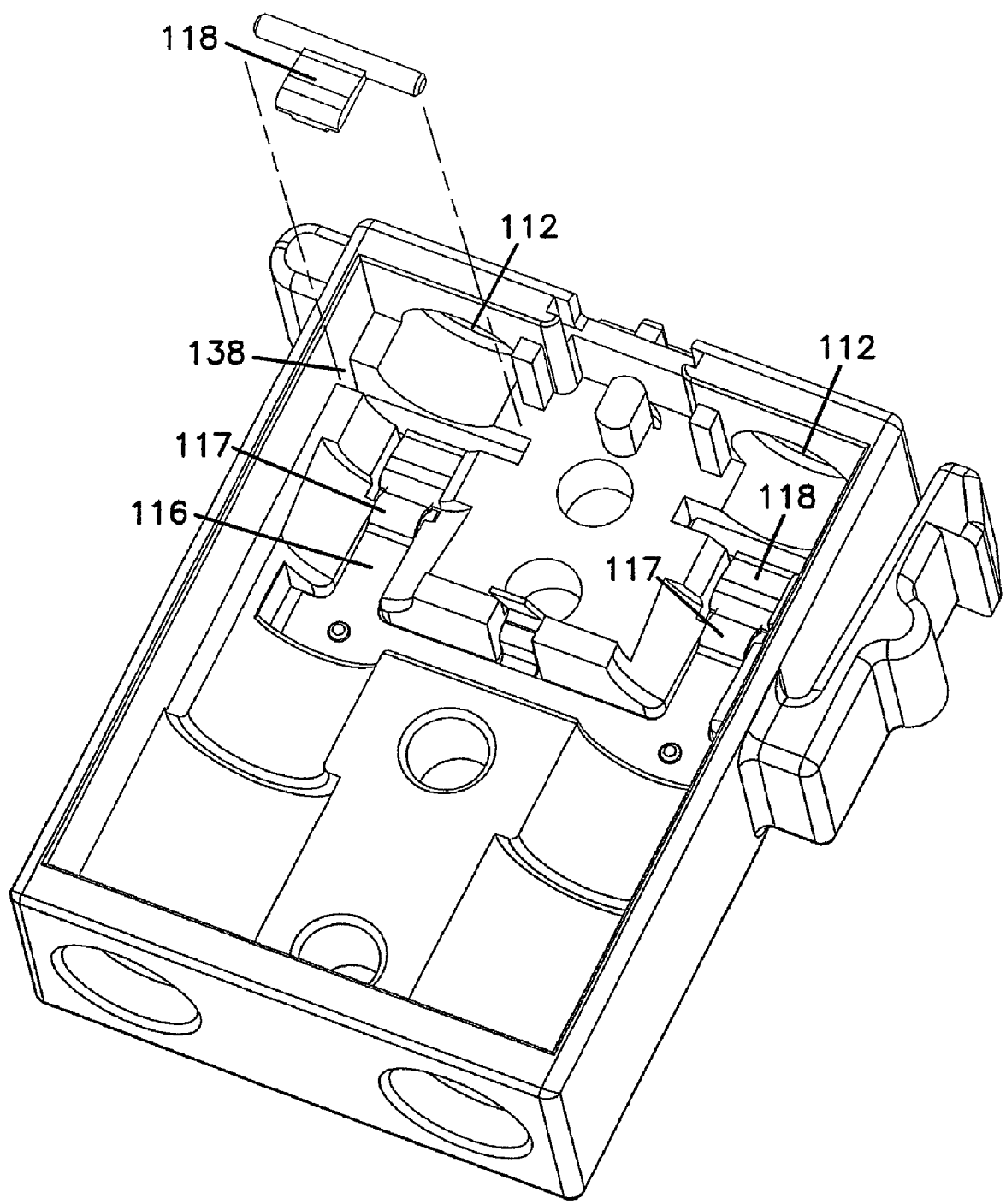
FIG. 12 is a perspective view of the jack housing of FIG. 11, with a shield conductor spring and insulated actuators positioned within the housing.

FIGS. 11 to 15 show a sequence for assembling components within interior 110 through opening 114 of housing 100. In FIG. 11, none of the components have been installed. In FIG. 12, shield conductor contact spring 116 has been positioned within a recess 134 with contact arms 117 in extensions 136 of recess 134. Insulated pivoting actuators 118 are positioned in slots 138 on top of arms 117. Arms 117 and spring 116 are preferably made of a resilient electrically conductive material. In a normal or unswitched position, with no connector inserted through openings 112, contact pads of arms 117 exert pressure against actuators 118 and deflect upward enough to establish and maintain contact with shield conductor 123 of coaxial assembly 124.

Figure 13:
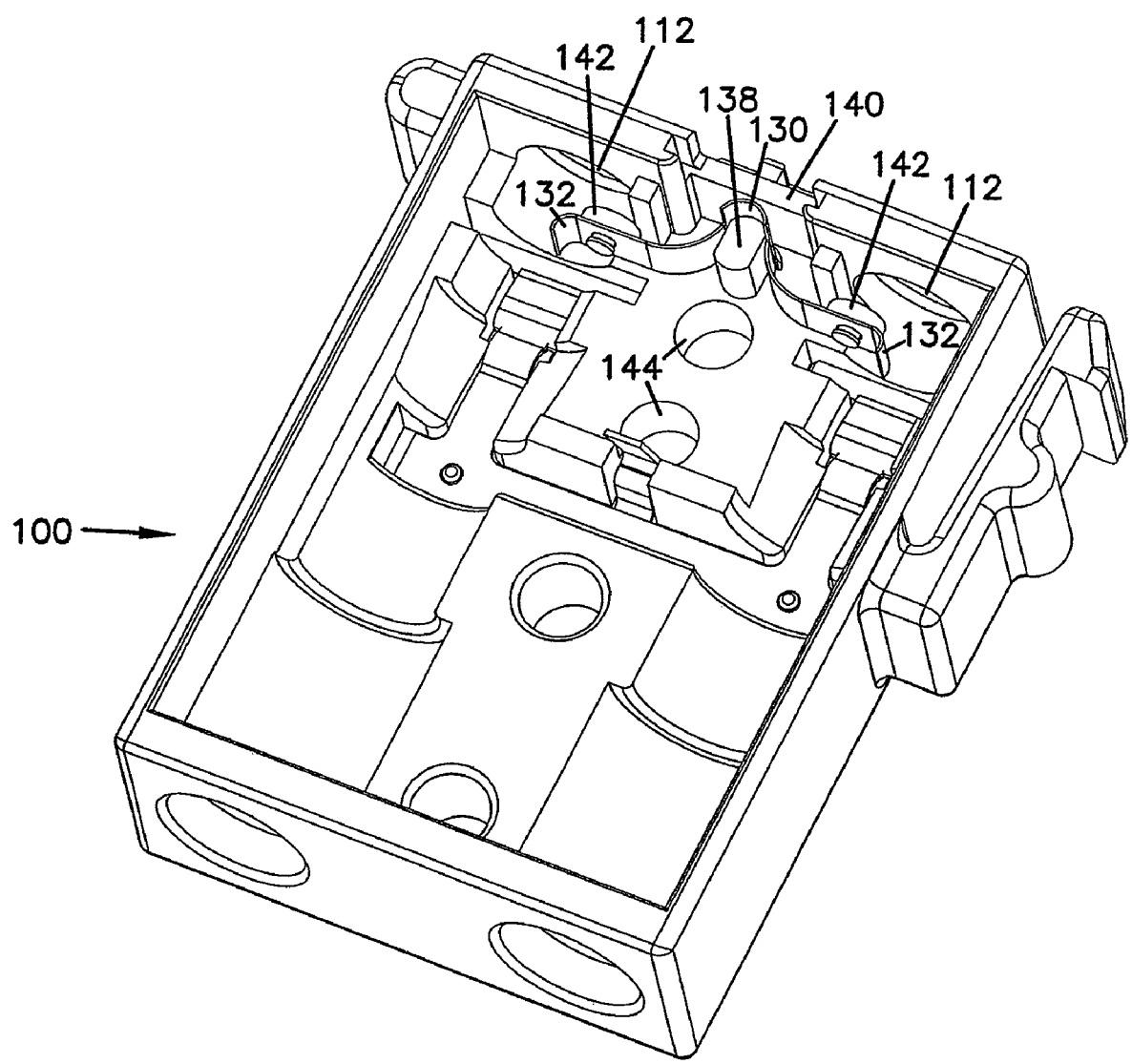
FIG. 13 is a perspective view of the jack housing of FIG. 12, with a center conductor spring positioned within the housing.

In FIG. 13, center conductor contact spring 130 has been positioned within housing 100 between a post 138 and front wall 140. Extensions 132 of spring 130 extend outward to be electrical contact with center conductors 125 of coaxial assembly 124. Mounted adjacent an outboard end of each extension 132 is an insulator pad 142. With no connector inserted through openings 112, spring 130 is normally electrically connecting center conductors 125.

Figure 14:
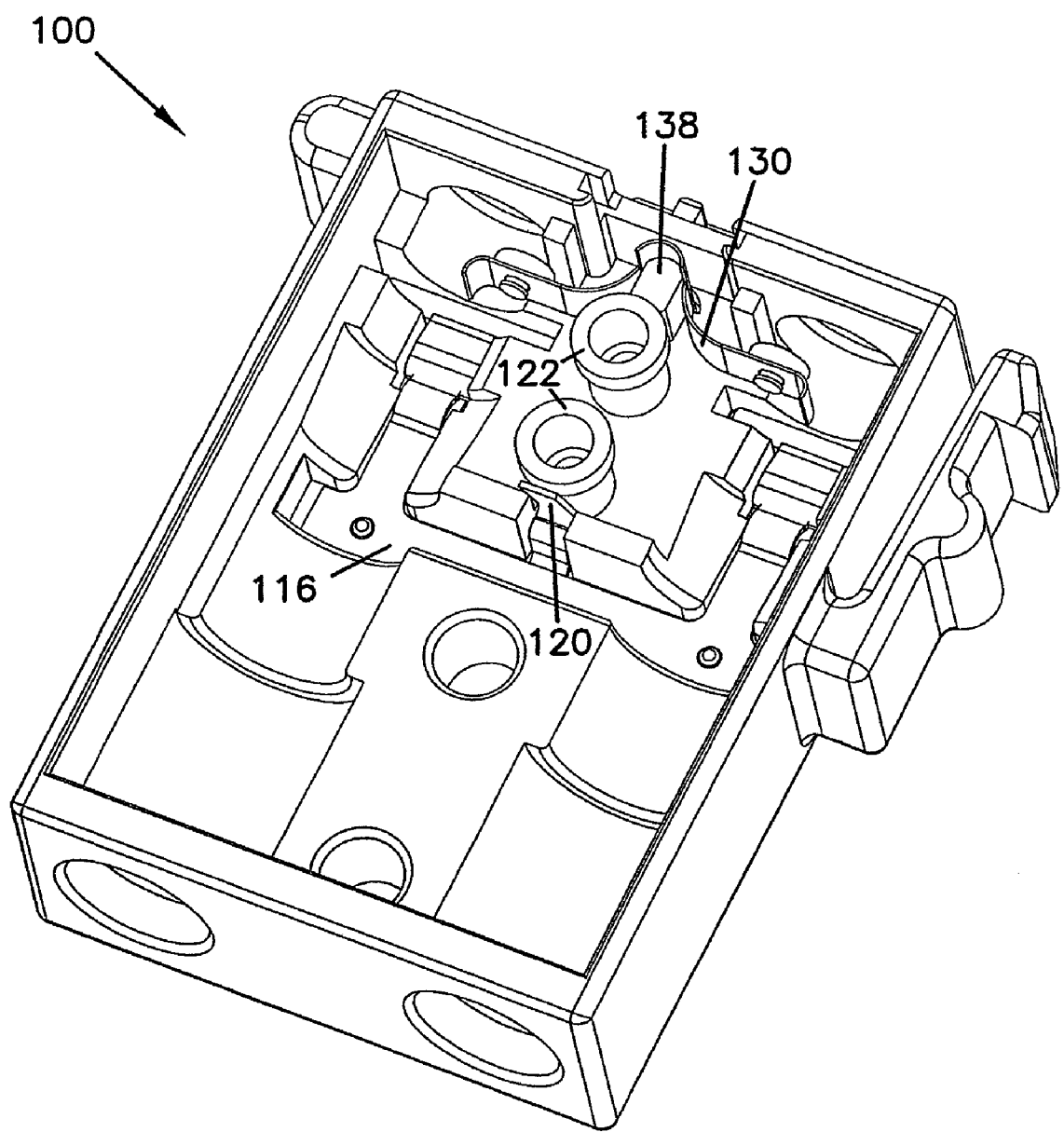
FIG. 14 is a perspective view of the jack housing of FIG. 13, with a pair of resistor sockets positioned within the housing.
Figure 15:
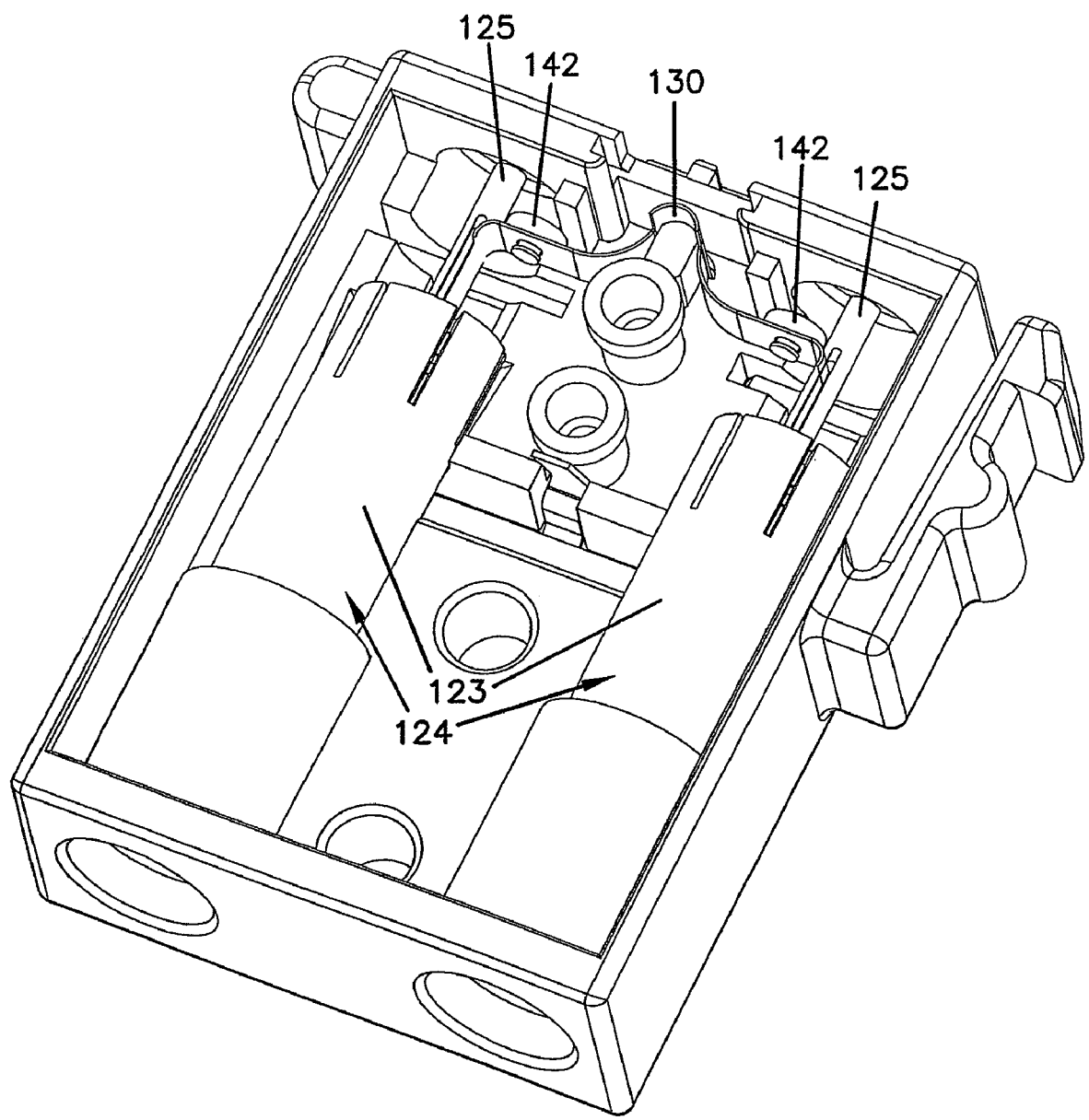
FIG. 15 is a perspective view of the jack housing of FIG. 14, with a pair of coaxial connector assemblies mounted within the housing.

In FIG. 14, resistor sockets 122 have been installed within recesses 144. One of the sockets 122 is positioned in contact with extension 120 of spring 116. The other socket is positioned adjacent post 138 near spring 130 but not normally in electrical contact with spring 130 or extensions 132. In FIG. 15, coaxial assemblies 124 have been positioned within housing 100 so that shield conductor 123 of each assembly 124 is in electrical contact with a pad of one of the arms 117 and center conductor 125 of each assembly 124 is in electrical contact with one of the extensions 132.

Figure 16:
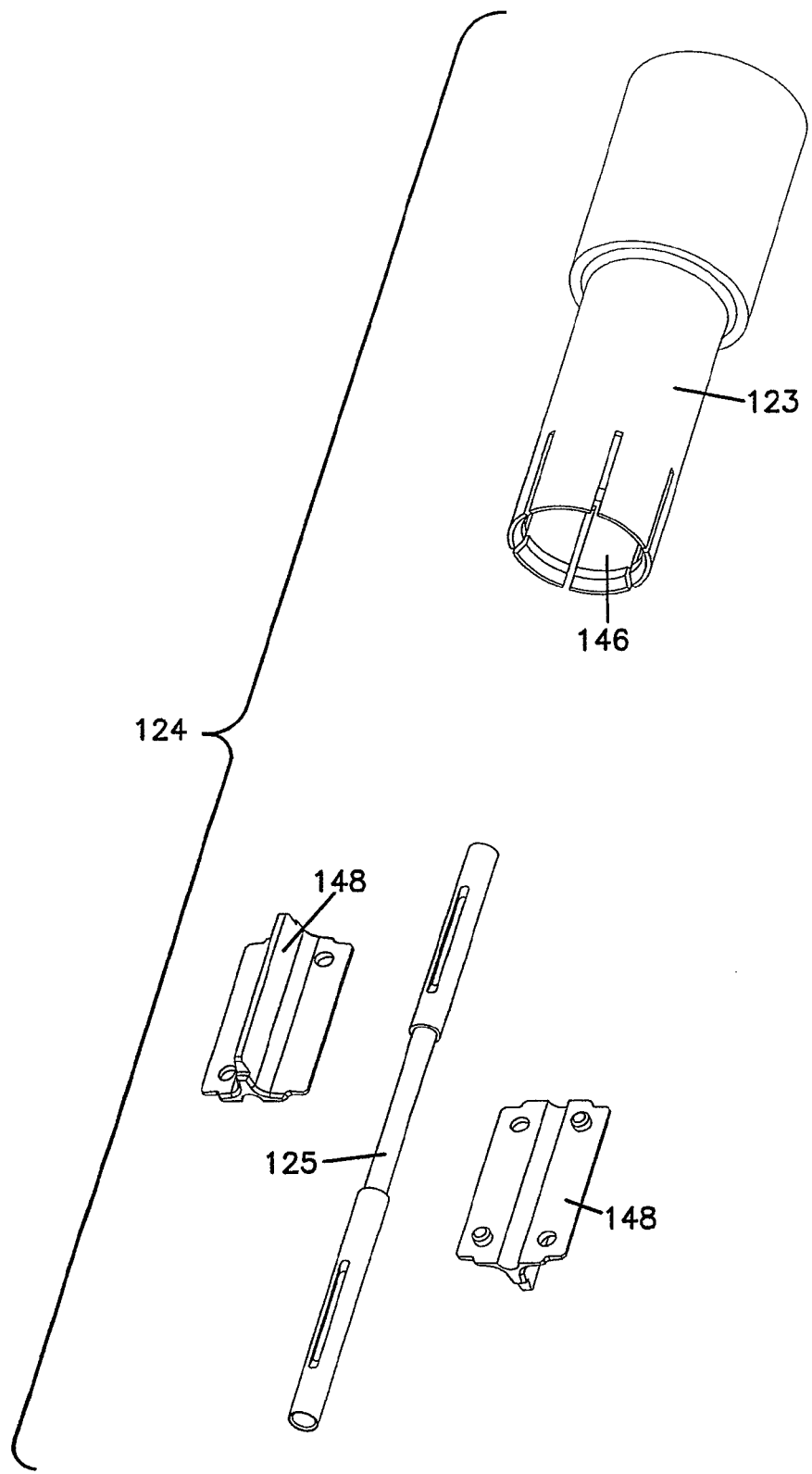
FIG. 16 is an exploded perspective view of the coaxial connector assembly of FIG. 15

FIG. 16 shows shield conductor 123 of coaxial assembly 124 defines an opening 146 within which is mounted center conductor 125 and insulator halves 148. Insulator halves 148 position center conductor 125 within opening 146 and electrical isolates center conductor 125 from shield conductor 123.

Figure 17:
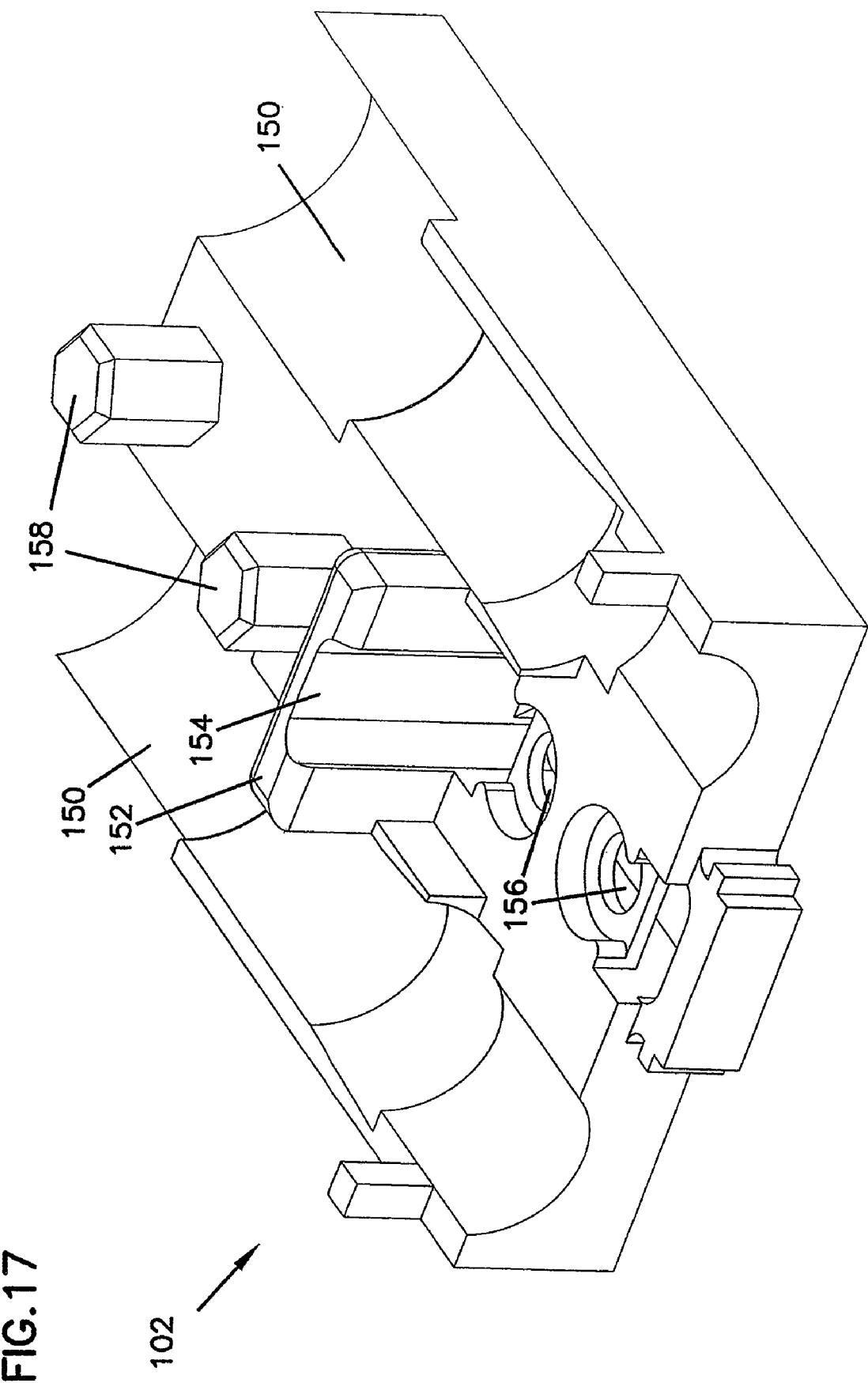
FIG. 17 is a perspective view of an inner surface of a mating cover for the jack assembly of FIG. 15.

FIG. 17 shows an inner surface of cover 102 with a pair of grooves for engaging coaxial assemblies 124, and a bulkhead 152 with a recess 154 to engage extension 120 and help maintain contact between extension 120 and resistor socket 122. A pair of openings 156 permit access to resistor sockets 122 through cover 102 for pins 128 of resistor pad 126. A pair of stand-offs 158 aid in the positioning of cover 102 within opening 114.

Figure 18:
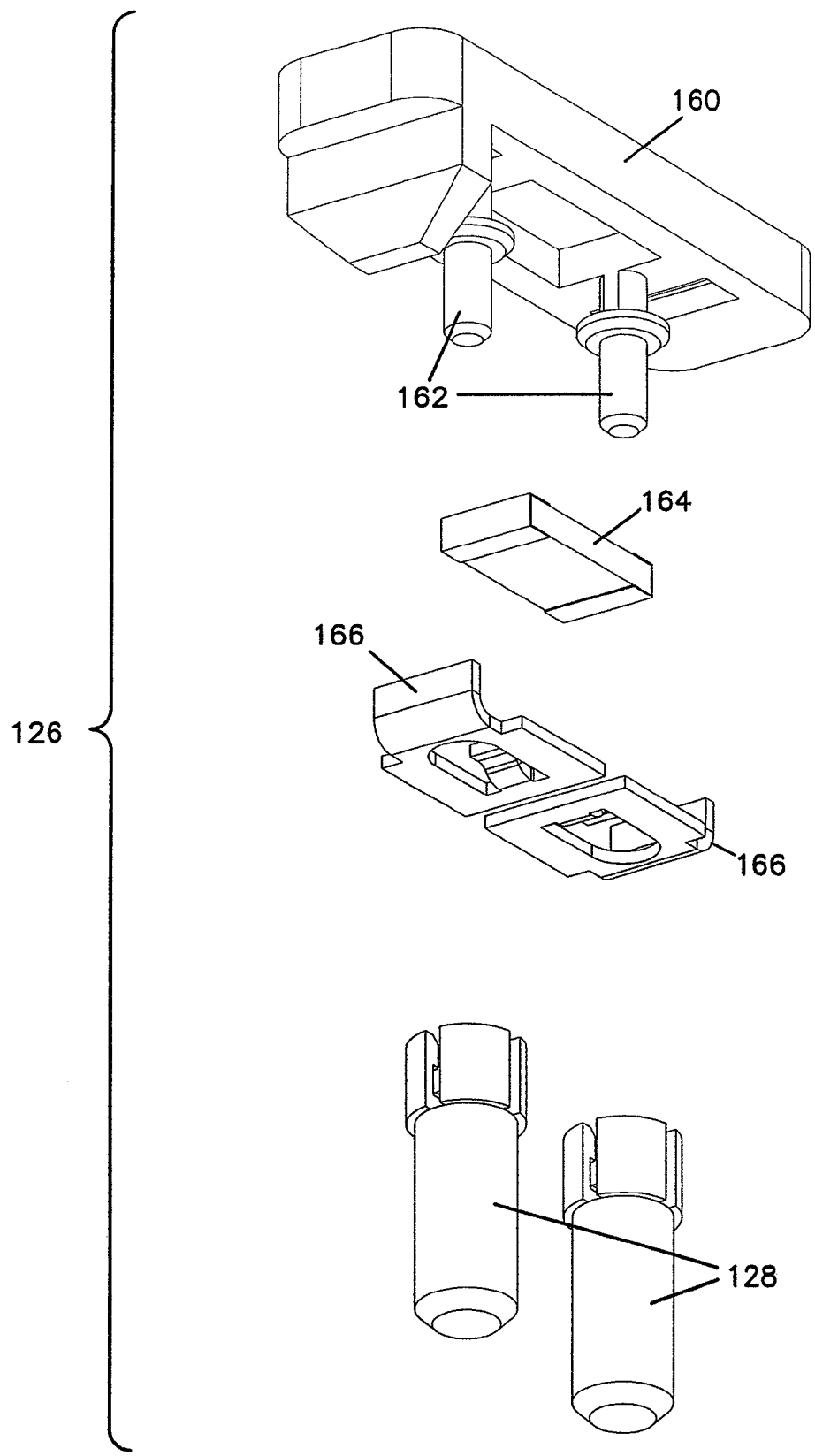
FIG. 18 is an exploded view of a resistor assembly for use with the jack housing of FIG. 9.

FIG. 18 shows resistor pad 126 with pins 128 and a cap 160 with a pair of assembly pins 162 extending downward. A resistor 164 is fitted between assembly pins 162 and a pair of springs 166. Pins 128 fit about assembly pins 162 and capture springs 166 and resistor 164 in electrical contact with each other. Resistor 164 provides a calibrated impedance to an electrical current passing from one of the pins 128 to the other pin 128.

Figure 25:
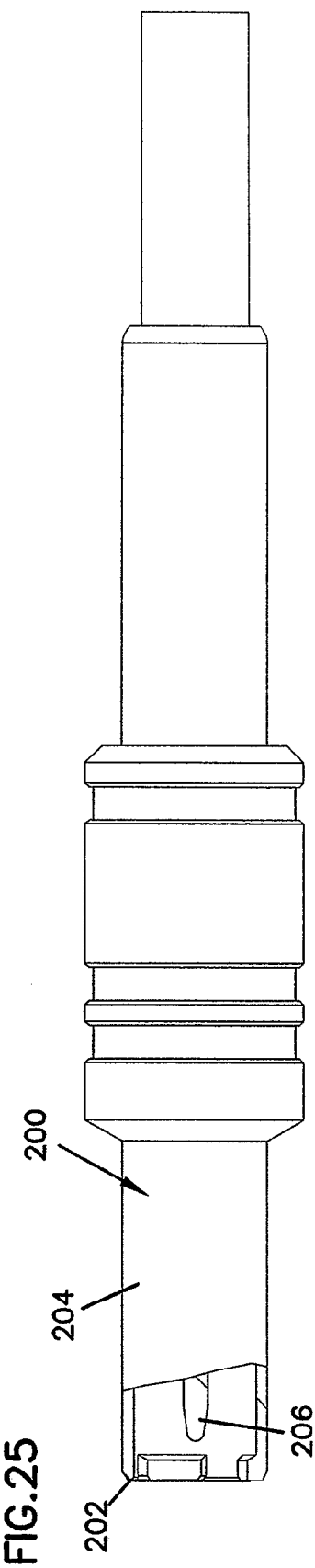
FIG. 25 is a side view of the first coaxial cable connector of FIG. 19, with a distal portion shown in partial cross-section.
Figure 26:
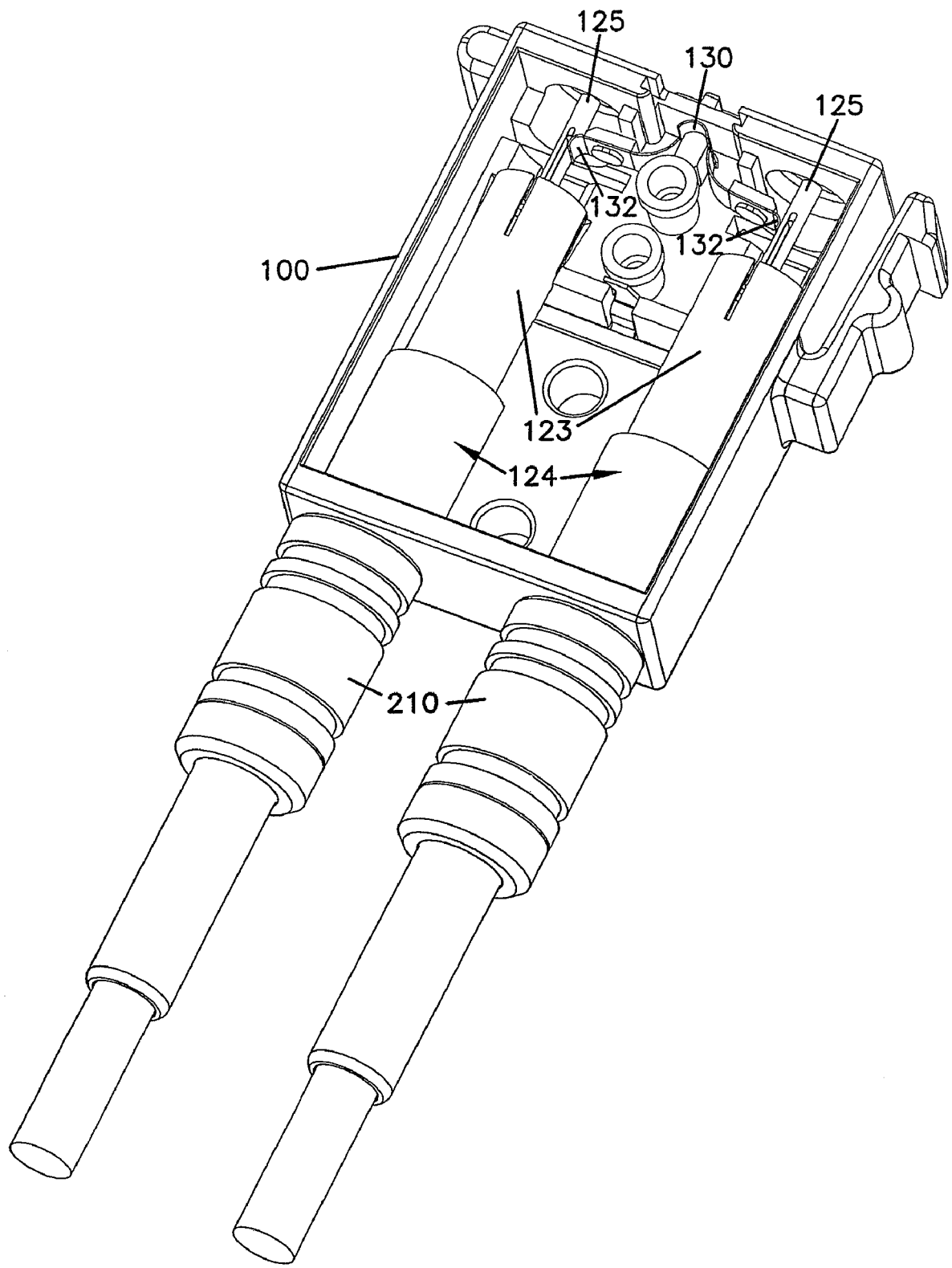
FIG. 26 is a perspective view of the jack housing of FIG. 15 with a pair of cable connectors inserted within rear openings of the switching jack.

FIGS. 19 and 25 show a coaxial connector 200 for insertion within front opening 112 to engage coaxial assembly 124 and includes a front lip 202. FIGS. 20 to 24 show a coaxial connector 210 for insertion within rear opening 24 to engage coaxial assembly 124. Coaxial assembly 124 electrically links an outer or shield conductor 204 of connector 200 with an outer or shield conductor 212 of connector 210, and a center conductor 206 of connector 200 with a center conductor 214 of connector 210. FIGS. 21 to 24 illustrate a series of steps for assembling connector 210 and mounting it as a termination to a coaxial cable 220. Coaxial cable 220 includes an outer or shield conductor 222 positioned between an outer sheathing 224 and an inner insulator 226. A center conductor 228 is positioned within inner insulator 226 and electrically insulated from outer conductor 222. Center conductor 214 of connector 210 includes a crimp cup 230 for receiving a distal end of center conductor 228 of cable 220. Crimp cup 230 is crimped about center conductor 228 and inserted within outer shell 212 within an insulator (not shown). Outer conductor 222 of cable 220 is separated from inner insulator 226 and positioned about a crimp portion 234 of connector 210. A crimp sleeve 232 positioned about outer sheathing 224 is positioned over the outer conductor 222 and about crimp portion 234 and mechanically crimped in place. Cable 220 is now secured to connector 210, with outer conductor 222 and center conductor 228, electrically connected with outer conductor 212 and center conductor 214, respectively, of connector 210.

Figure 27:
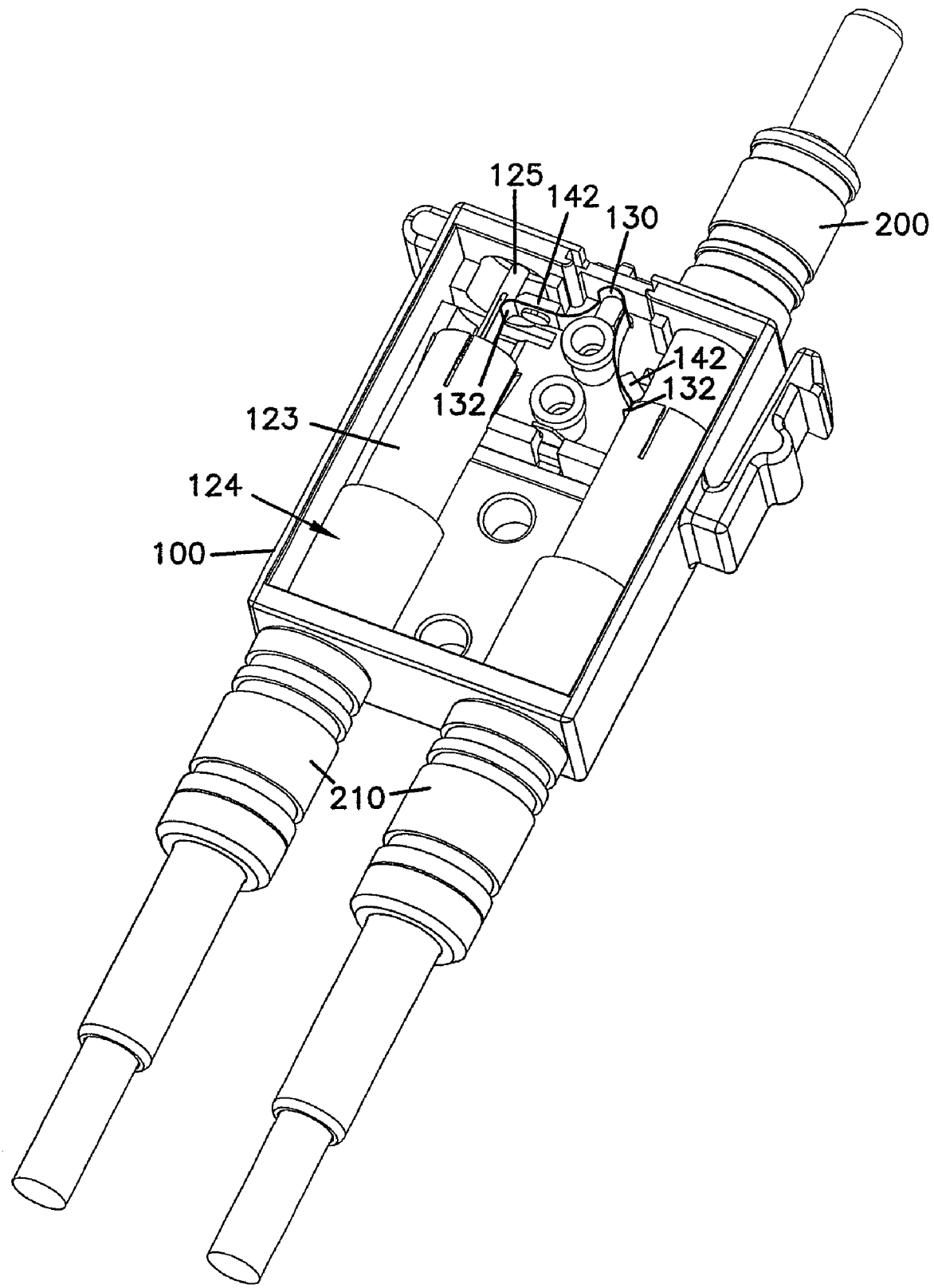
FIG. 27 is a perspective view of the jack housing of FIG. 26 with a first coaxial cable connector inserted within one of the front openings of the switching jack.

FIG. 27 shows switching jack 12 with cover 102 removed from housing 100 and two connectors 210 inserted in rear openings 24. In this arrangement, with no connectors 200 inserted within front openings 112, outer conductors 212 of each connector 210 are electrically connected by spring 116 and outer conductor 123. Center conductors 214 of connectors 210 are also electrically connected by spring 130 and center conductors 125.

When a connector 200 is first inserted within opening 112, front lip 202 makes contact with pad 142 of extension 132 of spring 130. Without making electrical contact with spring 130, front lip 202 deflects extension 132 away from contact with center conductor 125. This breaks the electrical linkage of center conductors 125. Pad 142 insulates outer conductor 204 of connector 200 from electrical contact with spring 130. After extension 132 is moved away from contact with center conductor 125, the extension is moved into electrical contact with resistor socket 122.

Further insertion of connector 200 brings front lip 202 into contact with actuator 118. Front lip 202 pushes against actuator 118 which in turn pushes against arm 117 of spring 116 to electrically disconnect spring 116 and outer conductor 123. Insulated pivoting actuator 118 prevents electrical contact between outer conductor 204 of connector 200 and spring 116. Further insertion of connector 200 within opening 112 will advance front lip 202 into outer conductor 123 and bring center conductors 206 and 125 into electrical contact. Outer conductors 123 and 204 form a continuous shield about the center conductors 125 and 206.

When one connector 200 is inserted within one coaxial assembly 124 through one of the openings 112, as shown in FIG. 27, the other coaxial assembly 124 remains in electrical contact with springs 116 and 130. If a resistor pad is inserted within sockets 122, this means that springs 116 and 130 now electrically connect the center and shield conductors of the other coaxial assembly 124. In some instances it is desirable to have some level of impedance, such as 75 ohms, between the center and shield conductors. Other levels of impedance may be provided by changing resistor 164 of resistor pad 126. In other instances, it may be desirable that the center and shield conductors of the unconnected coaxial assembly not be electrically linked. In these instances, a nonconductive insert may be placed in sockets 122.

Figure 28:
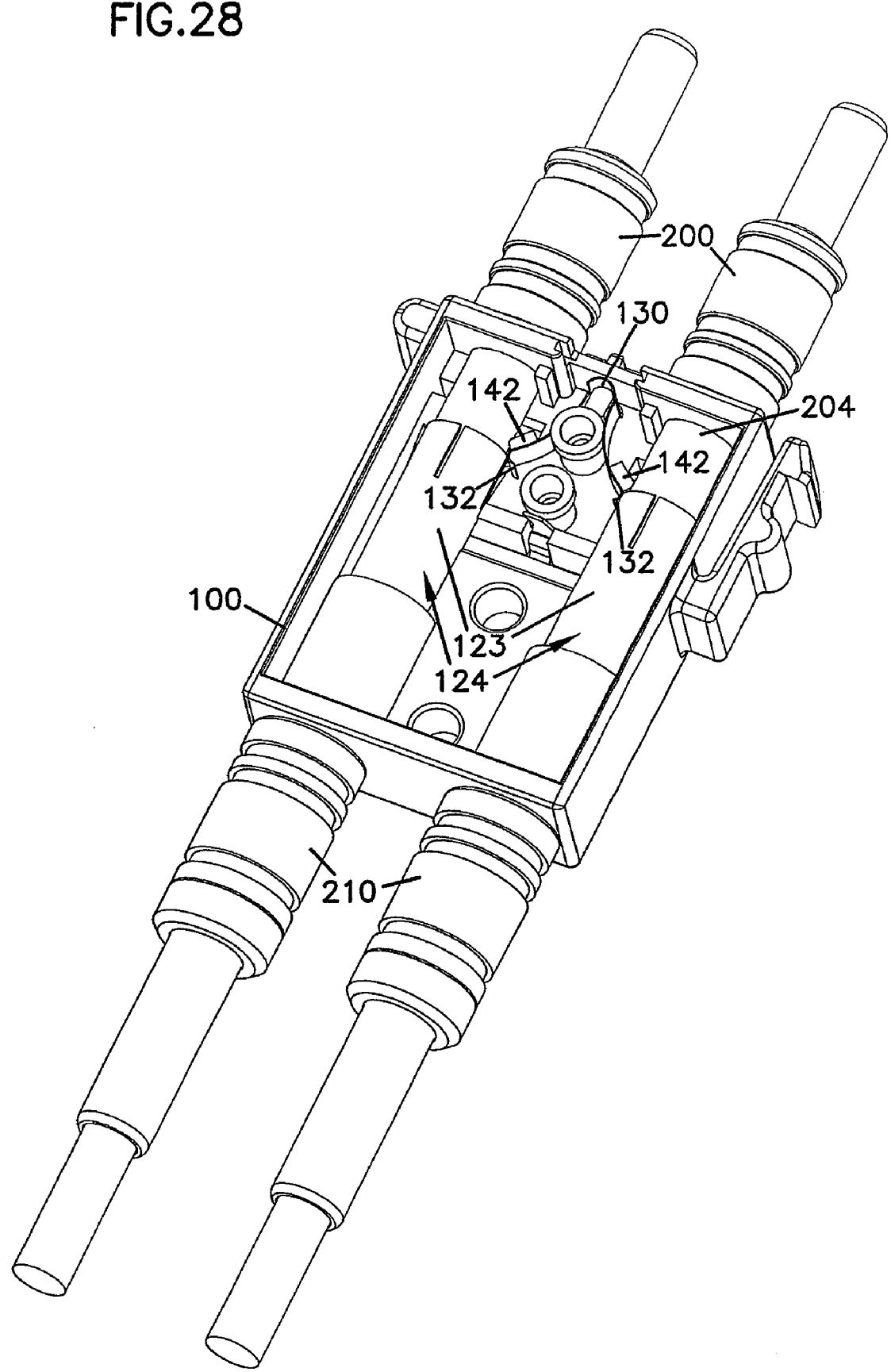
FIG. 28 is a perspective view of the jack housing of FIG. 27 with a pair of coaxial cable connectors inserted within the front openings of the switching jack.

When a second connector 200 is inserted into the other opening 112, front lip 202 deflects extension 132 from center conductor 125 and pushes on actuator 118 to deflect pad 117 from outer conductor 123 on the other coaxial assembly 124. This is shown in FIG. 28. In this situation, springs 116 and 130 are disconnected from electrical contact with any of the center or shield conductors of the coaxial assemblies or the coaxial connectors.

Housing 100 may also be used to construct a non-switching jack pair assembly as well. To construct this non-switching coaxial jack alternative, springs 116 and 130 are not inserted as described above. Coaxial assemblies 124 then serve as straight-through connections and still provide a continuous outer shield conductor about the entire length of all center conductors within the jack when connectors 200 and 210 are inserted.

The above specification, examples and data provide a complete description of the manufacture and use of the invention. Since many embodiments of the invention can be made without departing from the spirit and scope of the invention, the invention resides in the claims hereinafter appended.

What is claimed is:

1. A coaxial switching jack comprising:
   a housing including a pair of rear cable connection locations defined by rear openings and a pair of front cable connection locations defined by front openings, each front cable connection location configured to receive a mating coaxial cable connector, the housing including an open side and a cover positioned to cover the open side, the cover and the housing cooperating to define an interior;
   a pair of coaxial assemblies mounted within the housing, each coaxial assembly having a first end adjacent one of the front cable connection locations and a second end adjacent one of the rear cable connection locations, each coaxial assembly including a center conductor and an outer shell conductor, the center conductors of the coaxial assemblies being electrically connected to each other and the outer shell conductors of the coaxial assemblies being electrically connected to each other;

a jack spring assembly between the coaxial assemblies, the center conductors of the coaxial assemblies being electrically connected to each other and the outer shell conductors of the coaxial assemblies being electrically connected to each other through the jack spring assembly when the mating coaxial cable connector is not inserted into one of the cable connection locations, wherein the jack spring assembly includes a first conductive spring mounted within the housing, the first spring including a first arm and a second arm, each arm of the first conductive spring contacting a center conductor of each of the coaxial assemblies, each arm of the first conductive spring including an insulative pad which a front portion of the mating coaxial cable connector contacts to deflect the first conductive spring away from the center conductor of the corresponding coaxial assembly and wherein the insulative pad prevents the mating coaxial cable connector from electrically contacting the first conductive spring;

a resistor assembly mounted to the housing, the resistor assembly including a resistor, wherein a resistance level provided by the resistor assembly can be changed from an exterior of the housing without removing the cover from the housing; and a switch selectively disconnecting the center conductors and the outer shell conductors, respectively, wherein insertion of the mating coaxial cable connector into one of the front cable connection locations removes the center conductor of the corresponding coaxial assembly from electrical contact with the center conductor of the other coaxial assembly and removes the outer shell conductor of the corresponding coaxial assembly from electrical contact with the outer shell conductor of the other coaxial assembly, and electrically connects a center conductor of the mating coaxial cable connector with the center conductor of the corresponding coaxial assembly and electrically connects an outer shell conductor of the mating coaxial cable connector with the outer shell conductor of the corresponding coaxial assembly;

wherein once the mating coaxial cable connector is inserted into one of the front cable connections to engage the corresponding coaxial assembly, the outer shell conductor and the center conductor of the other coaxial assembly are electrically connected through the resistor of the resistor assembly, wherein when the mating coaxial cable connector is engaged with one of the coaxial assemblies, the outer shell conductors of the mating coaxial cable connector and the corresponding coaxial assembly form a continuous cylinder about the center conductors of the mating coaxial cable connector and the corresponding coaxial assembly, the continuous cylinder extending from the front openings to the rear openings of the housing.

2. A coaxial switching jack according to claim 1, wherein the resistor assembly may be configured to electrically isolate the outer shell conductor and the center conductor of the non-mated coaxial assembly.

3. A coaxial switching jack according to claim 1, wherein the resistance level provided by the resistor assembly is about 75 ohms.

4. A coaxial switching jack according to claim 1, wherein the housing defines a releasable cantilevered latch for providing a snap-fit interlock with a piece of telecommunications equipment.

5. A coaxial switching jack according to claim 4, wherein the housing includes a tab on one side and the releasable latch on an opposite side.

6. A method of using a coaxial switching jack assembly comprising:

providing a mounting plate with a front side and a rear side;

providing a housing with an open side and a cover positioned to cover the open side, the cover and the housing cooperating to define an interior;

mounting a pair of coaxial assemblies within the housing, each coaxial assembly including a center conductor and an outer shell conductor, the center conductors of the coaxial assemblies being electrically connected to each other and the outer shell conductors of the coaxial assemblies being electrically connected to each other;

mounting a resistor assembly to the housing, the resistor assembly including a resistor;

snap-fitting the housing to the mounting plate from a rear side of the plate, wherein the mounting plate provides access to the coaxial assemblies within the housing from a front side of the plate;

inserting a mating coaxial cable connector into the panel to engage one of the coaxial assemblies to remove the center conductor of the corresponding coaxial assembly from electrical contact with the center conductor of the other non-engaged coaxial assembly and to remove the outer shell conductor of the corresponding coaxial assembly from electrical contact with the outer shell conductor of the other non-engaged coaxial assembly, and to electrically connect a center conductor of the mating coaxial cable connector with the center conductor of the corresponding coaxial assembly and to electrically connect an outer shell conductor of the mating coaxial cable connector with the outer shell conductor of the corresponding coaxial assembly, and to electrically connect together the outer shell conductor and the center conductor of the other non-engaged coaxial assembly through the resistor of the resistor assembly; and changing the resistance level provided by the resistor assembly from an exterior of the housing without removing the cover from the housing wherein the impedance level between the center conductor and the outer shell conductor of the other non-engaged coaxial assembly is changed.

7. A method according to claim 6, further comprising snap-fitting a plurality of the housings to the mounting plate, each housing including the pair of the coaxial assemblies within the housing.

8. A method according to claim 6, wherein the housing defines a releasable cantilevered latch for providing the snap-fit with the mounting plate.

9. A method according to claim 6, further comprising changing the resistance level provided by the resistor assembly such that the outer shell conductor and the center conductor of the other non-engaged coaxial assembly are electrically isolated from each other.

10. A method according to claim 6, wherein the resistance level provided by the resistor assembly is about 75 ohms.

11. A method according to claim 6, wherein the housing includes a pair of rear cable connection locations and a pair of front cable connection locations, each coaxial assembly includes a first end adjacent one of the front cable connection locations and a second end adjacent one of the rear cable connection locations.

12. A method according to claim 11, wherein the front cable connection locations are defined by front openings of the housing and the rear cable connection locations are defined by rear openings of the housing, the method further comprising forming a continuous cylindrical conductive passage about the center conductors of the mating coaxial cable connector and the corresponding coaxial assembly when the mating coaxial cable connector is engaged with one of the coaxial assemblies, the cylindrical conductive passage extending from the front openings to the rear opening of the housing.

13. A method according to claim 6, wherein a jack spring assembly is provided between the coaxial assemblies such that the center conductors of the coaxial assemblies are electrically connected to each other and the outer shell conductors of the coaxial assemblies are electrically connected to each other through the jack spring assembly when the mating coaxial cable connector is not inserted into one of the cable connection locations.

14. A method according to claim 13, wherein the jack spring assembly includes a first conductive spring mounted within the housing, the first spring including a first arm and a second arm, each arm of the first conductive spring contacting a center conductor of each of the coaxial assemblies, each arm of the first conductive spring including an insulative pad which a front portion of the mating coaxial cable connector contacts to deflect the first conductive spring away from the center conductor of the corresponding coaxial assembly and wherein the insulative pad prevents the mating coaxial cable connector from electrically contacting the first conductive spring.

* * * * *